(No Model.)
C. W. ISBELL.
PIPE JOINT.
No. 248,469.
Patented Oct. 18, 1881.
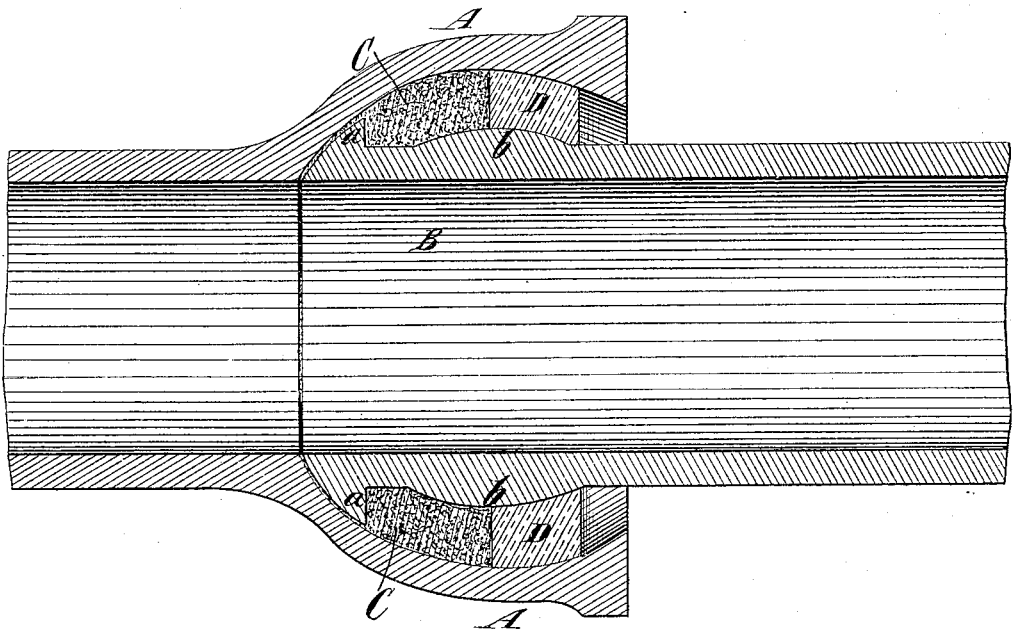
Witnesses:
Louis M. Whitehead
Fred Haynes
Inventor:
Charles W. Isbell
by his Attorneys
Brown & Brown

UNITED STATES PATENT OFFICE.

CHARLES W. ISBELL, OF NEW YORK, N. Y.

PIPE-JOINT.

SPECIFICATION forming part of Letters Patent No. 248,469, dated October 18, 1881.

Application filed November 5, 1880. (No model.)

*To all whom it may concern:*

Be it known that I, CHARLES W. ISBELL, of the city and county of New York, in the State of New York, have invented a certain new and useful Improvement in Pipe-Joints, of which the following is a specification.

My invention relates what are known as "bell" and "spigot" joints for gas and water mains, and particularly to that kind known as "flexible" joints, which permit of the pipes being laid at an angle to each other, to form curves.

The invention consists in the combination, in a pipe-joint, of a bell having its interior of spherical segmental configuration, a spigot having a flange or shoulder near its end, and an annular bead or projection extending beyond the external surface of the spigot in rear of said flange or shoulder, a lead packing locked to said spigot by said bead or projection, and an oakum packing inserted against said flange or shoulder and held between it and said lead packing, whereby the oakum and lead packing are both made to turn with the spigot within the bell.

The accompanying drawing represents a longitudinal section of a pipe-joint embodying my invention.

A designates a bell which is formed upon one pipe, and B designates a spigot formed upon the adjacent end of another pipe. The internal configuration of the bell A is that of the segment of a sphere, as clearly shown. The spigot B is of approximately cylindrical form, and it is provided at or near its open end with a flange or shoulder, *a*, and below or beyond said flange or shoulder it preferably conforms in external configuration to the inner surface of the bell A.

In rear of the shoulder or flange *a* the spigot is provided with a retaining device consisting of a bead, protuberance, or enlargement, *b*, to retain the lead, as fully hereinafter explained, which projects beyond the external surface of the spigot.

In making the joint, a mass of oakum, C, is inserted and calked tightly up against the flange or shoulder *a*, and afterward lead is poured in and calked up to form a ring, D, in front of the oakum and back of the bead or enlargement *b*, thus serving to hold the oakum in place. The water-tight joint is made solely by the elastic oakum, and the lead is employed solely to hold it in place and retain it against the flange or shoulder *a*.

The lead packing D is secured immovably upon the spigot by the bead or enlargement *b*, and the oakum is held between the shoulder or flange *a* and said lead packing; hence when the pipe upon which is the spigot is moved or swung out of line with the pipe upon which is the bell, the oakum and lead will both move with the spigot, and the elastic oakum will form a water-tight joint at whatever angle the pipes are placed, and even when the interior of the bell has a rough unfinished surface.

As here shown, the bell is continued considerably beyond the center from which its interior surface is struck, thus forming a contracted mouth, which, in connection with the lead packing D, prevents the spigot from being pulled from the bell and the joint broken.

By my invention I provide for constructing flexible pipe-joints without any boring or turning, and thus dispense with an operation which has formed an important item in the cost of these joints as heretofore constructed.

What I claim as my invention, and desire to secure by Letters Patent, is—

The combination of the bell A, having its interior of spherical segmental configuration, the spigot B, having a flange or shoulder, *a*, and the annular bead or projection *b* beyond the external surface of the spigot, the lead packing D, locked to the spigot by said bead or projection *b*, and the oakum packing C, held between said flange or shoulder *a* and said lead packing, substantially as herein described.

CHAS. W. ISBELL.

Witnesses:
FREDK. HAYNES,
A. C. WEBB.